United States Patent
Fenny et al.

(10) Patent No.: US 10,676,183 B2
(45) Date of Patent: Jun. 9, 2020

(54) FORWARD FOLDING ROTOR BLADES

(71) Applicant: Bell Helicopter Textron Inc., Fort Worth, TX (US)

(72) Inventors: Carlos Alexander Fenny, Fort Worth, TX (US); Rohn Lee Olson, Hurst, TX (US); Andrew James Zahasky, North Richland Hills, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 382 days.

(21) Appl. No.: 15/593,521

(22) Filed: May 12, 2017

(65) Prior Publication Data

US 2018/0186445 A1 Jul. 5, 2018

Related U.S. Application Data

(60) Provisional application No. 62/336,290, filed on May 13, 2016, provisional application No. 62/336,432, (Continued)

(51) Int. Cl.
*B64C 27/50* (2006.01)
*B64C 11/28* (2006.01)
(Continued)

(52) U.S. Cl.
CPC .............. *B64C 27/50* (2013.01); *B64C 1/068* (2013.01); *B64C 3/10* (2013.01); *B64C 11/28* (2013.01);
(Continued)

(58) Field of Classification Search
CPC ....... B64C 11/28; B64C 27/022; B64C 27/50; B63H 1/22; B63H 1/24
(Continued)

(56) References Cited

U.S. PATENT DOCUMENTS

D174,679 S 5/1955 Cochran
D181,599 S 12/1957 Nelson et al.
(Continued)

FOREIGN PATENT DOCUMENTS

CA 2827210 A1 8/2012
CN 105438464 A 3/2016
(Continued)

OTHER PUBLICATIONS

Canadian Intellectual Property Office, Examination Report for Canadian Appl. No. 2,967,402 dated Sep. 5, 2018, 6 pp.
(Continued)

*Primary Examiner* — Nicholas McFall
(74) *Attorney, Agent, or Firm* — Daniel J. Chalker; Edwin S. Flores; Chalker Flores, LLP

(57) ABSTRACT

A rotor blade rotation system includes two or more rotor blades, each rotor blade in mechanical communication with a hub and pivotable about an axis of rotation, a bearing plate comprising a rotating portion and a non-rotating portion, a fold linkage coupled to the rotating portion of the bearing plate and in mechanical communication with the rotor blade, and an actuator coupled to the non-rotating portion of the bearing plate and operable to reposition the bearing plate from a first position to a second position such that the folding links pivot the rotor blades from a deployed position to a forward folded position.

24 Claims, 17 Drawing Sheets

Related U.S. Application Data filed on May 13, 2016, provisional application No. 62/336,363, filed on May 13, 2016, provisional application No. 62/336,420, filed on May 13, 2016, provisional application No. 62/336,465, filed on May 13, 2016.

(51) Int. Cl.

| | | |
|---|---|---|
| *B64C 39/06* | (2006.01) | |
| *B64C 29/00* | (2006.01) | |
| *B64C 3/10* | (2006.01) | |
| *B64C 27/08* | (2006.01) | |
| *B64C 27/12* | (2006.01) | |
| *B64D 27/24* | (2006.01) | |
| *B64D 31/00* | (2006.01) | |
| *B64C 29/02* | (2006.01) | |
| *B64C 1/06* | (2006.01) | |
| *B64C 39/02* | (2006.01) | |
| *B64C 1/00* | (2006.01) | |
| *B64D 27/02* | (2006.01) | |

(52) U.S. Cl.
CPC ............ *B64C 27/08* (2013.01); *B64C 27/12* (2013.01); *B64C 29/0025* (2013.01); *B64C 29/02* (2013.01); *B64C 39/024* (2013.01); *B64C 39/06* (2013.01); *B64C 39/062* (2013.01); *B64D 27/24* (2013.01); *B64D 31/00* (2013.01); *B64C 2001/0045* (2013.01); *B64D 2027/026* (2013.01)

(58) Field of Classification Search
USPC .................................................. 416/142, 143
See application file for complete search history.

(56) References Cited

U.S. PATENT DOCUMENTS

| | | |
|---|---|---|
| D185,870 S | 8/1959 | Apostolescu |
| 3,005,603 A | 10/1961 | Gaskins |
| D193,245 S | 7/1962 | Know, Jr. |
| 3,082,977 A | 3/1963 | Arlin |
| D197,447 S | 2/1964 | Friedrich |
| 3,350,035 A | 10/1967 | Schlieben |
| D213,708 S | 4/1969 | Blumenthal |
| D214,577 S | 7/1969 | Mueller |
| 3,640,489 A | 2/1972 | Jaeger |
| 3,834,654 A | 9/1974 | Miranda |
| D241,565 S | 9/1976 | Molenaar |
| D314,549 S | 2/1991 | Myers |
| 5,062,587 A | 11/1991 | Wernicke |
| D324,890 S | 3/1992 | Smiel |
| 5,114,096 A | 5/1992 | Wernicke |
| 5,150,857 A | 9/1992 | Moffet et al. |
| 5,178,344 A | 1/1993 | Dlouhy |
| 5,305,970 A | 4/1994 | Porter et al. |
| 5,351,911 A | 10/1994 | Neumayr |
| 5,595,358 A * | 1/1997 | Demidov ............... B64C 29/02 244/12.2 |
| D379,339 S | 5/1997 | Guspodin et al. |
| 6,382,560 B1 | 5/2002 | Ow |
| 6,607,162 B2 | 8/2003 | Warsop et al. |
| 6,688,936 B2 | 2/2004 | Davis |
| 6,921,313 B2 | 7/2005 | Yu |
| D543,928 S | 6/2007 | Sanders, Jr. et al. |
| 7,370,828 B2 | 5/2008 | Stephens |
| 7,658,346 B2 | 2/2010 | Goossen |
| 7,794,302 B2 | 9/2010 | Davis |
| D640,757 S | 6/2011 | Cheng |
| 8,083,173 B2 | 12/2011 | Arlton et al. |
| D664,214 S | 7/2012 | Yuen |
| D679,340 S | 4/2013 | Genovese |
| 8,408,489 B2 | 4/2013 | Gosling |
| 8,733,690 B2 | 5/2014 | Bevirt et al. |
| D740,892 S | 10/2015 | Chen |
| 9,156,545 B1 | 10/2015 | Fenny et al. |
| 9,242,729 B1 | 1/2016 | Wang et al. |
| 9,527,581 B2 | 12/2016 | Bevirt et al. |
| 2002/0142699 A1 | 10/2002 | Davis |
| 2006/0108477 A1 | 5/2006 | Helou, Jr. |
| 2007/0069065 A1 | 3/2007 | Parks |
| 2007/0215746 A1* | 9/2007 | Rieken ................ B64C 39/06 244/6 |
| 2010/0025526 A1 | 2/2010 | Lawrence |
| 2010/0072325 A1* | 3/2010 | Sambell ............... B64C 11/28 244/7 A |
| 2011/0042509 A1 | 2/2011 | Bevirt et al. |
| 2013/0241086 A1 | 9/2013 | Sakane |
| 2014/0097290 A1 | 4/2014 | Leng |
| 2014/0217229 A1 | 8/2014 | Chan |
| 2015/0012154 A1 | 1/2015 | Senkel et al. |
| 2015/0108280 A1 | 4/2015 | Willard, Jr. |
| 2015/0183514 A1 | 7/2015 | Page et al. |
| 2015/0217851 A1 | 8/2015 | Kelso |
| 2015/0274290 A1* | 10/2015 | Fenny .................. B64C 27/50 244/17.25 |
| 2016/0026190 A1 | 1/2016 | Kowalski |
| 2016/0031555 A1 | 2/2016 | Bevirt et al. |
| 2016/0048132 A1 | 2/2016 | Cherpinsky et al. |
| 2016/0107751 A1 | 4/2016 | Raffaello et al. |
| 2016/0170416 A1 | 6/2016 | Chen et al. |
| 2018/0215462 A1 | 8/2018 | Fenny et al. |
| 2018/0244364 A1 | 8/2018 | Fenny et al. |
| 2018/0244376 A1 | 8/2018 | Fenny et al. |
| 2018/0244381 A1 | 8/2018 | Fenny et al. |

FOREIGN PATENT DOCUMENTS

| | | |
|---|---|---|
| DE | 2854977 A1 | 10/1980 |
| DE | 3240995 A1 | 3/1984 |
| EP | 2119626 A1 | 11/2009 |
| EP | 2733068 A2 | 5/2014 |
| EP | 3243745 A1 | 11/2017 |
| EP | 3243747 A1 | 11/2017 |
| EP | 3243750 A1 | 11/2017 |
| GB | 1085541 A | 10/1967 |
| GB | 1281382 A | 7/1972 |
| JP | 2014240242 | 12/2014 |
| SI | 21457 A | 9/2004 |
| WO | 1991/007314 | 5/1991 |
| WO | 2007133182 A2 | 11/2007 |
| WO | 2015/102425 A1 | 9/2015 |
| WO | 2015/143093 A2 | 9/2015 |
| WO | 2016/068784 A1 | 5/2016 |

OTHER PUBLICATIONS

Canadian Intellectual Property Office, Examination Report for Canadian Appl. No. 2,967,228 dated Sep. 7, 2018, 12 pp.
European Patent Office, Communicaiton pursuant to Article 94(3) EPC for EP Appl. No. 17170905.8 dated Sep. 24, 2018, 6 pp.
European Patent Office, Communication pursuant to Article 94(3) EPC for EP Appl. No. 17170907.4 dated Sep. 13, 2018, 7 pp.
European Patent Office, European Search Report for EP Appl. No. 17170907.4 dated Oct. 5, 2017, 7 pp.
European Patent Office, European Search Report for EP Appl. No. 17170905.8 dated Sep. 21, 2017, 7 pp.
European Patent Office, European Search Report for EP Appl. No. 17170906.6 dated Oct. 2, 2017, 6 pp.
Goruney, et al. "Flow past a delta wing with a sinusoidal leading edge: near-surface topology and flow structure" Experiments in Fluids; Experimental Methods and Their Applications to Fluid Flow, Springer, Berlin, DE, vol. 47, No. 2, May 10, 2009 pp. 321-331, XP019739243, ISSN: 1432-1114, doi: 10.1007/s00348-009-0666-x.
Aurora Flight Sciences "Aurora Wins DARPA Contract for Nation's Next VTOL X-Plane" (http://www.aurora.aero/lightningstrike/) 2015.
Felder, et al. "Turboelectric Distributed Propulsion Engine Cycle Analysis for Hybrid-Wing-Body Aircraft" American Institute of Aeronautics and Astronautics, 25 pp. Jan. 2009.

(56) References Cited

OTHER PUBLICATIONS

NASA, "Release 16-060" Jun. 17, 2016 (http://www.nasa.gov/press-release/nasa-electric-research-plane-gets-x-n . . . ).
Onera the French Aerospace Lab "Prospective Electrical aircraft: daring to make a breakthrough to meet the challenge" Annual Report 2014 (http://w3.onera.fr/rapport-annuel/en/2014/prospective) 2 pp.
Schiltgen, et al. "Hybrid-electric distributed propulsion explored" SAE International, Apr. 4, 2014 (http://articles.sae.org/13049/).
Stoll, et al. "A Multifunctional Rotor Concept for Quiet and Efficient VTOL Aircraft" Aviation Technology, Integration, and Operations Conference, Aug. 12-14, 2013, Los Angeles, CA , American Institute of Aeroneautics and Astronauts, 7 pp.
Stoll, et al. "Concept Design of the Joby S2 Electric VTOL PAV" Aviation Technology, Integration, and Operations Conference, Jun. 16-20, 2014, Atlanta, GA, American Institute of Aeroneautics and Astronauts, 6 pp.
Canadian Intellectual Property Office, Examination Report for Canadian Appl. No. 2,967,221 dated Dec. 27, 2018, 4 pp.
Canadian Intellectual Property Office, Examination Report for Canadian Appl. No. 2,967,228 dated May 13, 2019, 4 pp.
Canadian Intellectual Property Office, Examination Report for Canadian Appl. No. 2,967,221 dated Mar. 27, 2018, 4 pp.
European Patent Office, Communication pursuant to Article 94(3) EPC for EP Appl. No. 17170905.8 dated Oct. 12, 2017, 9 pp.
European Patent Office, Communication pursuant to Article 94(3) EPC for EP Appl. No. 17170905.8 dated Mar. 19, 2018, 7 pp.
European Patent Office, Communication pursuant to Article 94(3) EPC for EP Appl. No. 17170906.6 dated Oct. 20, 2017, 8 pp.
European Patent Office, Communication pursuant to Article 94(3) EPC for EP Appl. No. 17170906.6 dated Mar. 19, 2018, 6 pp.
European Patent Office, Communication pursuant to Article 94(3) EPC for EP Appl. No. 17170907.4 dated Oct. 24, 2017, 9 pp.
European Patent Office, Communication pursuant to Article 94(3) EPC for EP Appl. No. 17170907.4 dated Apr. 16, 2018, 6 pp.
Perry, et al. "Systems review exercise @BULLET to be posted this weekend @BULLET due next Friday (3/6) coming week: @BULLET Lab 13: Hydraulic power Steering @BULLET Lab 14: Integrated Lab (Hydraulic test bench) Topics today: @ BULLET Pumps and motors @ BULLET (Hydraulic hybrids)", Jan. 1, 2004, ZP055457362, Retried from the Internet: URL:http://www.me.umn.edu/courses/me4232/Lectures/Lect6_S15.pdf.
Canadian Intellectual Property Office, Examination Report for Canadian Appl. No. 2,967,402 dated May 31, 2019, 4 pp.
Title: "Proto10 hovering and translating at NASA AMES" by Oliver Garrow, Published/Posted on Aug. 19, 2017, Site Name:YOUTUBE:COM, URL:https://www.youtube.com/watch?v=KdGo0Gikx_Y&feature=youtu.be.

* cited by examiner

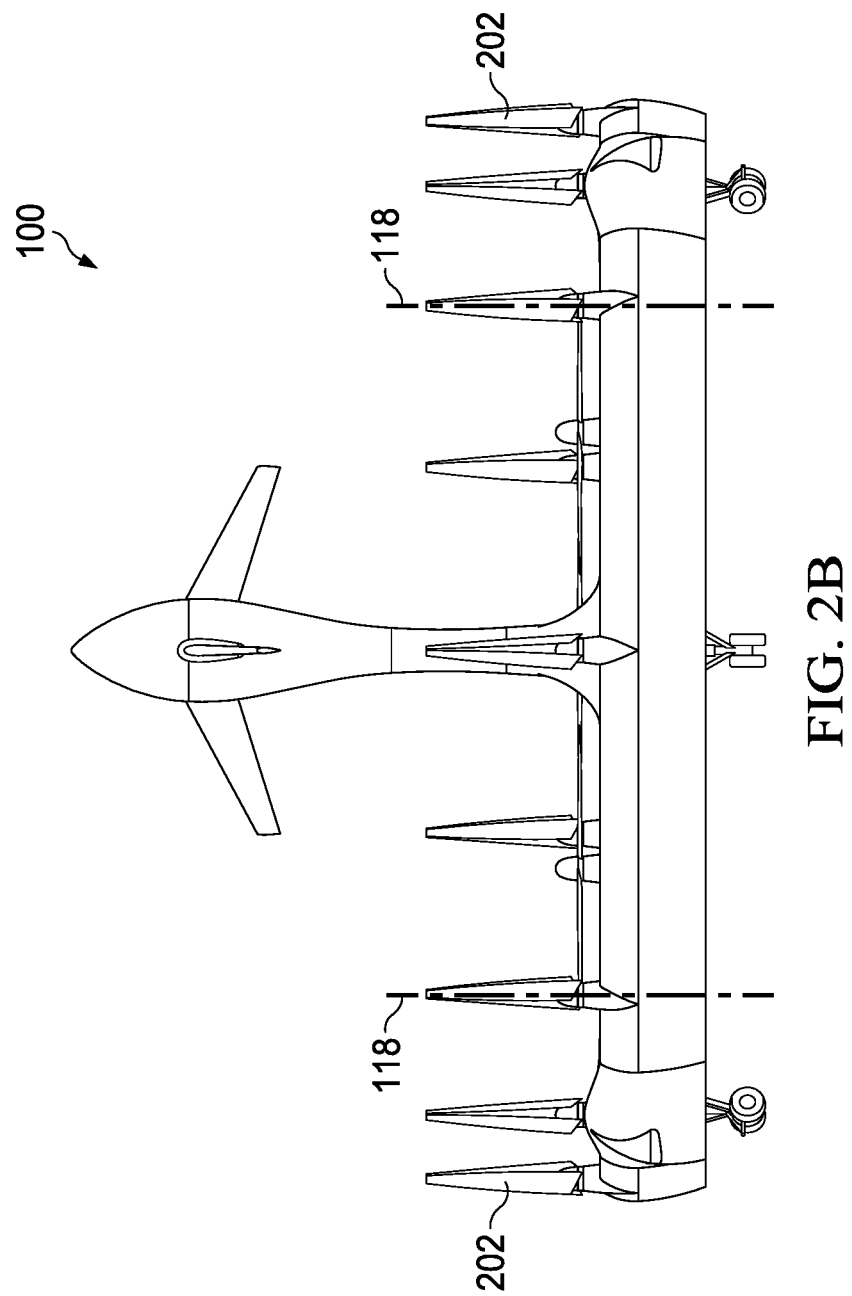

FORWARD FOLDING ROTOR BLADES

CROSS-REFERENCE TO RELATED APPLICATIONS

This application claims priority to U.S. Provisional Application Ser. No. 62/336,290, filed May 13, 2016 entitled "Distributed Propulsion", U.S. Provisional Application Ser. No. 62/336,432, filed May 13, 2016 entitled "Forward Folding Rotor Blades", U.S. Provisional Application Ser. No. 62/336,363, filed May 13, 2016 entitled "Vertical Take Off and Landing Closed Wing Aircraft", U.S. Provisional Application Ser. No. 62/336,420, filed May 13, 2016 entitled "Distributed Propulsion System for Vertical Take Off and Landing Closed Wing Aircraft", and U.S. Provisional Application Ser. No. 62/336,465, filed May 13, 2016 entitled "Modular Fuselage Sections for Vertical Take Off and Landing Distributed Airframe Aircraft", the entire contents of which are incorporated herein by reference.

TECHNICAL FIELD OF THE INVENTION

The present invention relates in general to the field of aircraft design, and more particularly, to forward folding rotor blades.

STATEMENT OF FEDERALLY FUNDED RESEARCH

None.

BACKGROUND OF THE INVENTION

Without limiting the scope of the invention, its background is described in connection with aircraft. U.S. Pat. No. 9,156,545 discloses an example of backward folding rotor blades and is hereby incorporated by reference in its entirety. Backward folding rotor blades may, however, not be desirable for some aircraft designs. As a result, there is a need for forward folding rotor blades.

SUMMARY OF THE INVENTION

A rotor blade rotation system includes two or more rotor blades, each rotor blade in mechanical communication with a hub and pivotable about an axis of rotation, a bearing plate comprising a rotating portion and a non-rotating portion, a fold linkage coupled to the rotating portion of the bearing plate and in mechanical communication with the rotor blade, and an actuator coupled to the non-rotating portion of the bearing plate and operable to reposition the bearing plate from a first position to a second position such that the folding links pivot the rotor blades from a deployed position to a forward folded position.

An aircraft may include a fuselage, a wing coupled to the fuselage, one or more engines or motors disposed within or attached to the wing or fuselage, a shaft operable connected to the one or more engines or motors, a hub in mechanical communication with the shaft, two or more rotor blades, each rotor blade in mechanical communication with the hub and pivotable about an axis of rotation, a bearing plate comprising a rotating portion and a non-rotating portion, a fold linkage coupled to the rotating portion of the bearing plate and in mechanical communication with the rotor blade, and an actuator coupled to the non-rotating portion of the bearing plate and operable to reposition the bearing plate from a first position to a second position such that the folding links pivot the rotor blades from a deployed position to a forward folded position.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 2B is a front elevation view of the closed wing aircraft of FIG. 2A;

DETAILED DESCRIPTION OF THE INVENTION

Figure 1A:
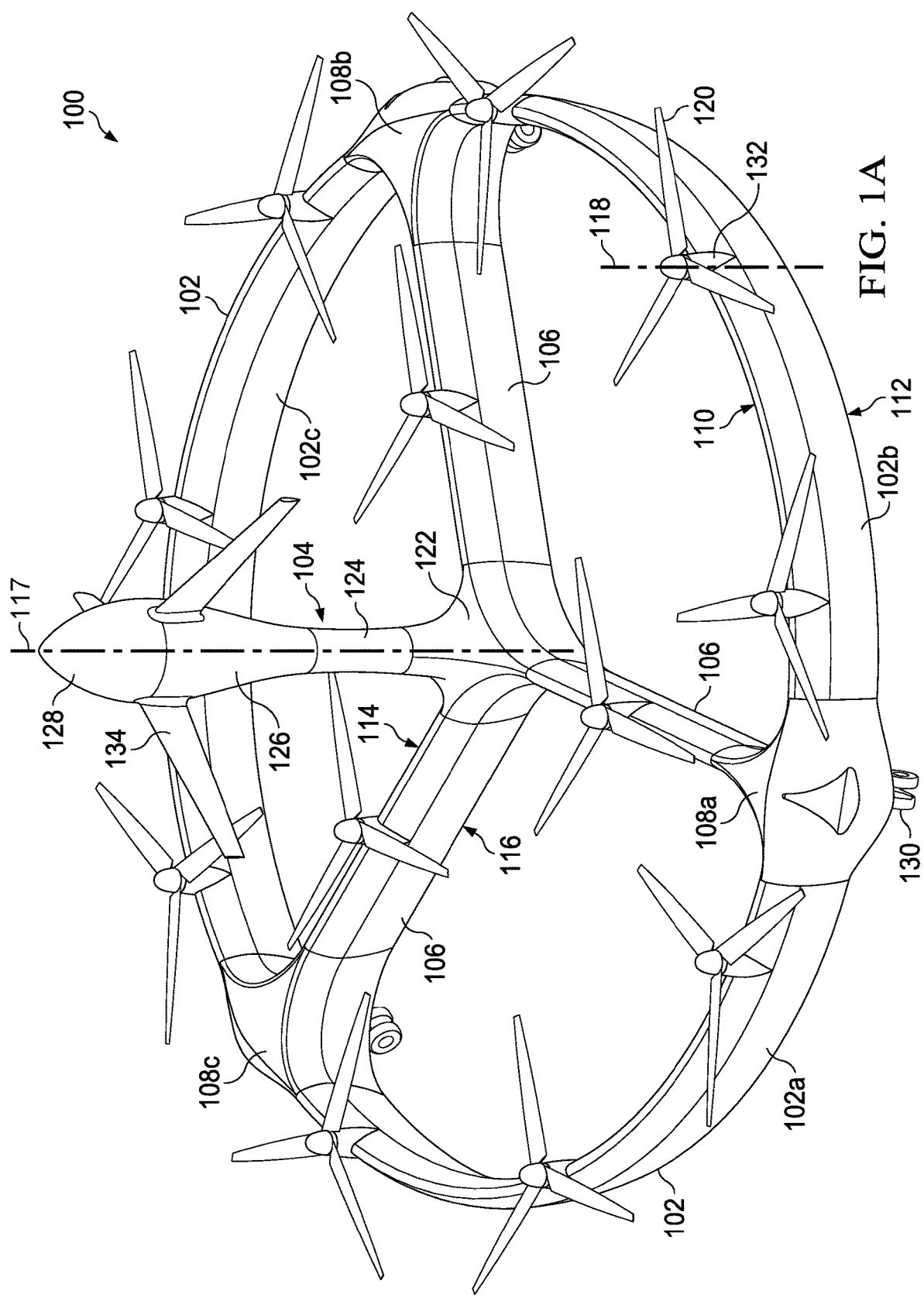
FIG. 1A is a perspective view of a closed wing aircraft in accordance with one embodiment of the present invention.

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The forward folding rotor blades described herein are not limited to the closed wing aircraft illustrated in the figures. The present invention is applicable to any propeller in which it is desirable to fold the rotor blades in a forward direction. As a result, the present invention is not limited to closed wing aircraft.

Figure 1B:
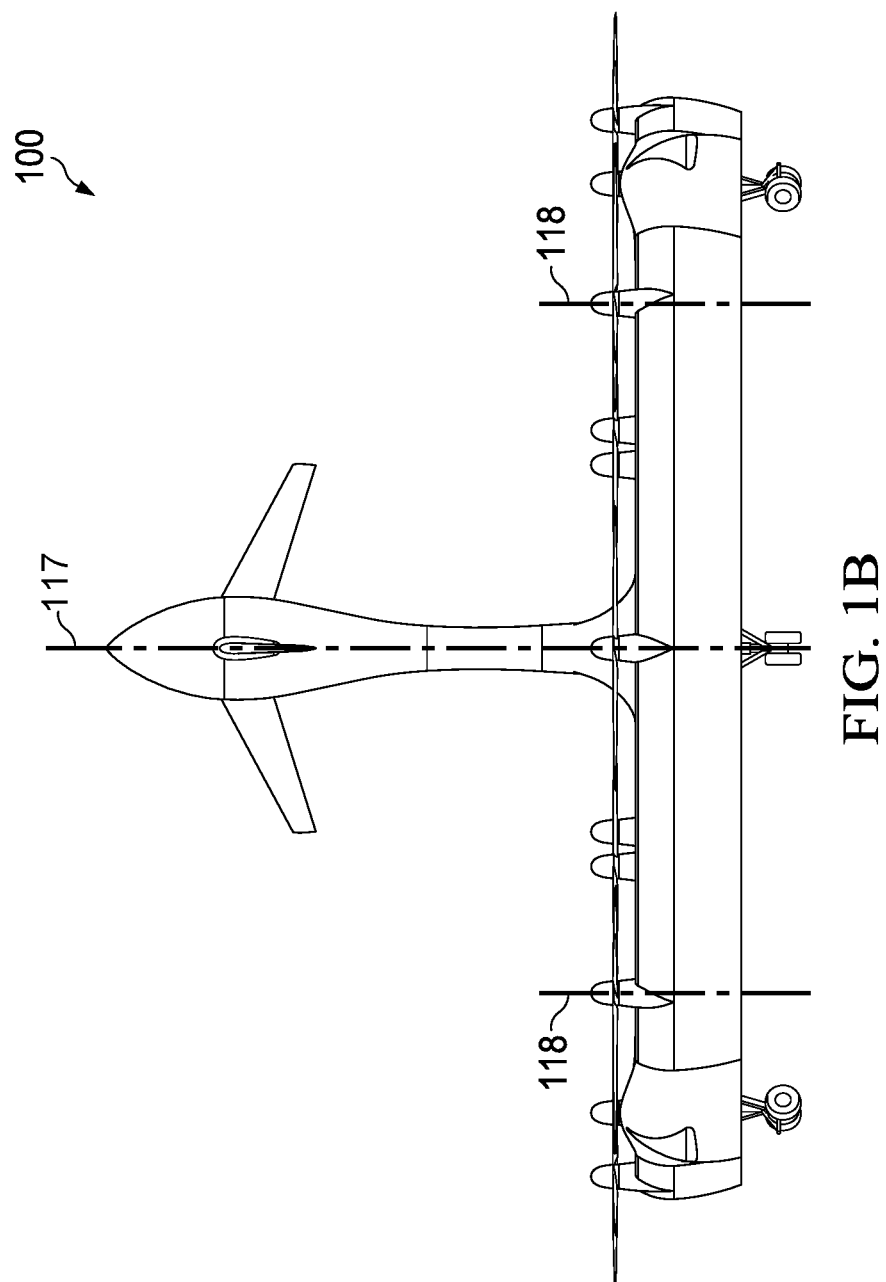
FIG. 1B is a front elevation view of the closed wing aircraft of FIG. 1A.
Figure 1C:
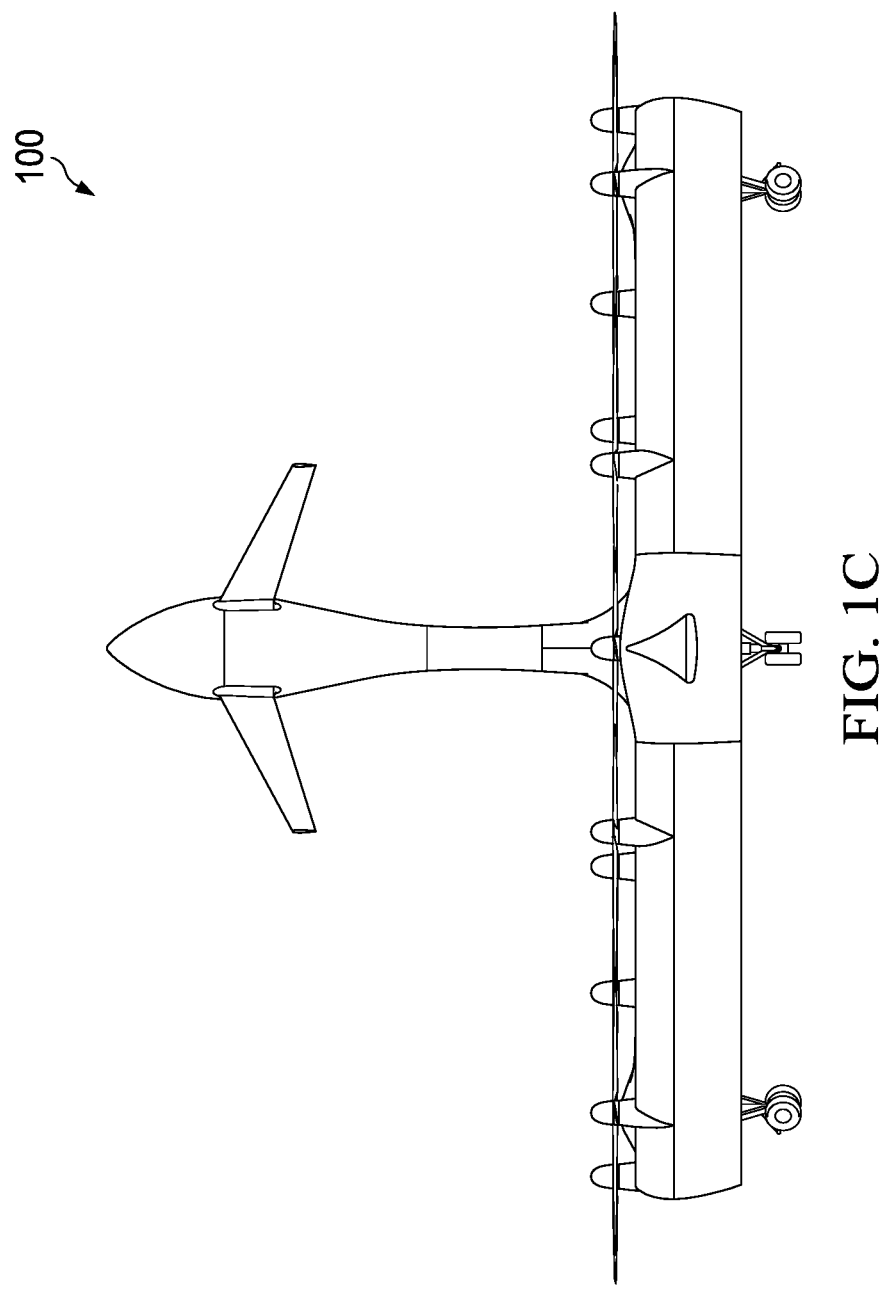
FIG. 1C is a rear elevation view of the closed wing aircraft of FIG. 1A.
Figure 1D:
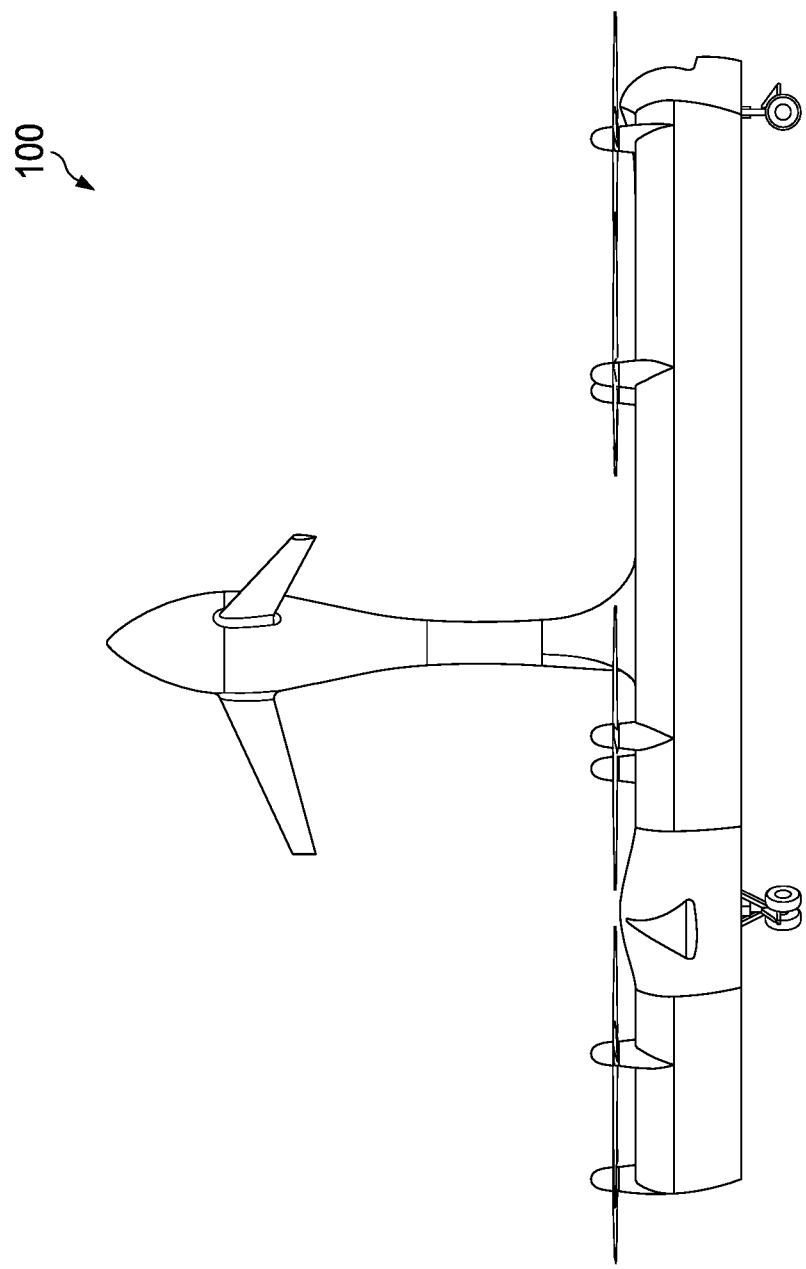
FIG. 1D is a right side elevation view of the closed wing aircraft of FIG. 1A.
Figure 1E:
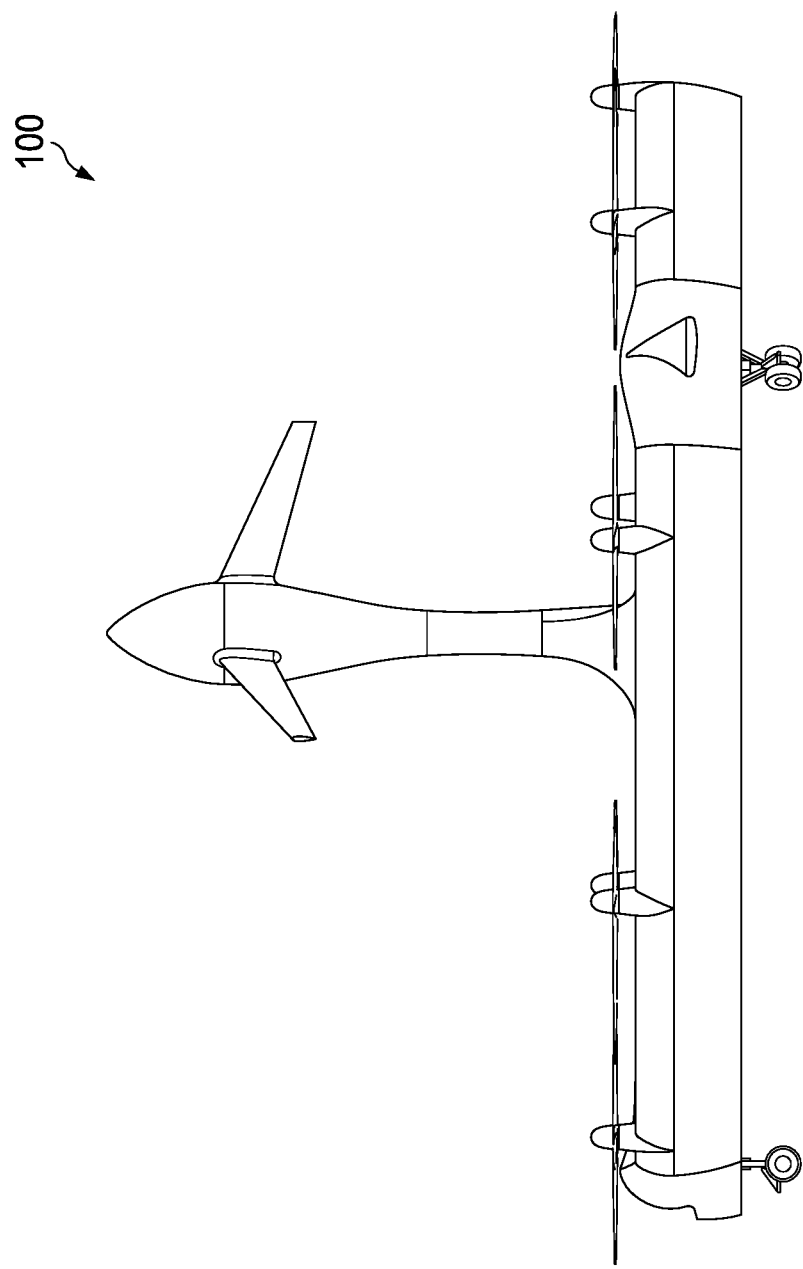
FIG. 1E is a left side elevation view of the closed wing aircraft of FIG. 1A.
Figure 1F:
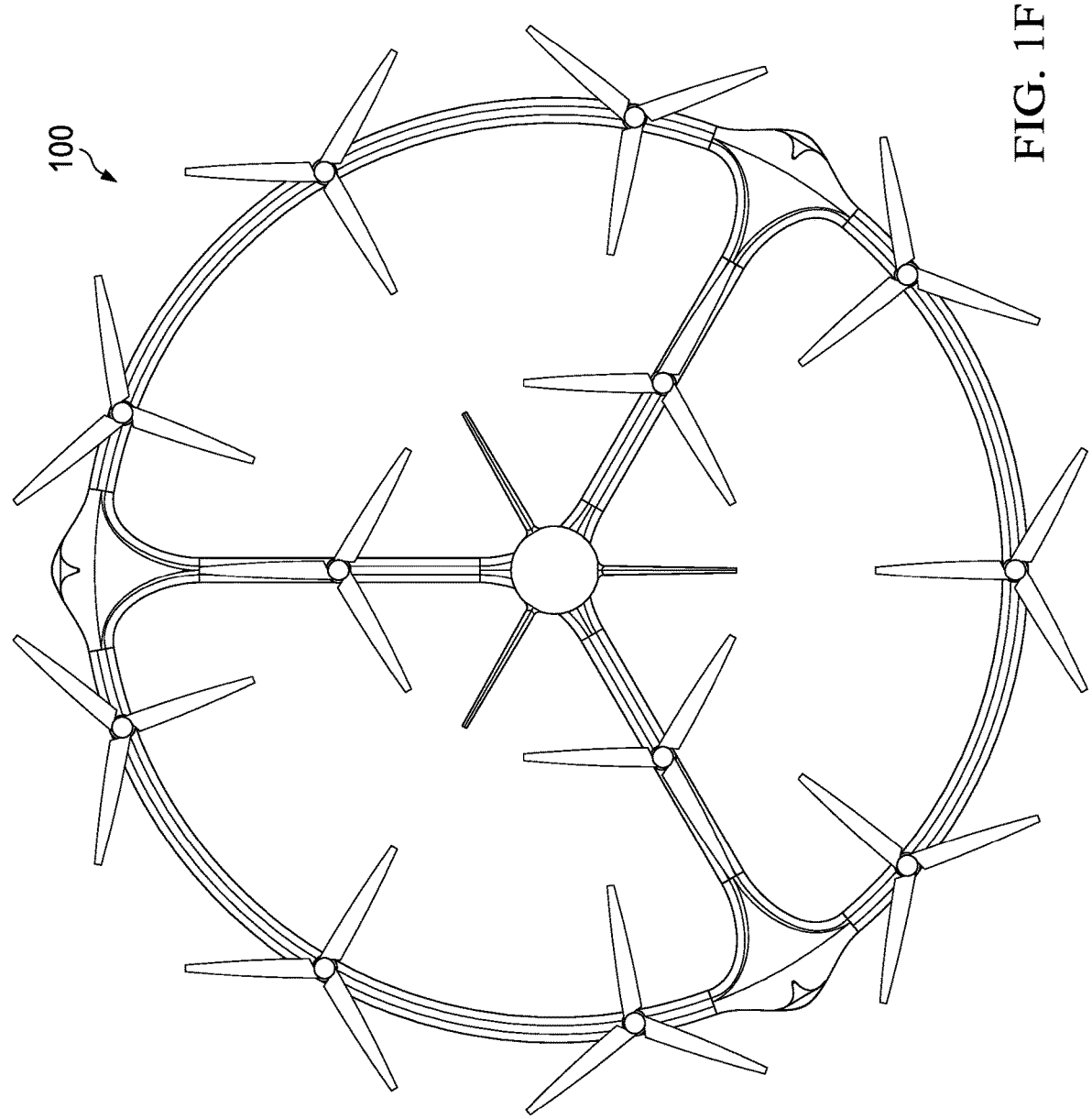
FIG. 1F is a top plan view of the closed wing aircraft of FIG. 1A.
Figure 1G:
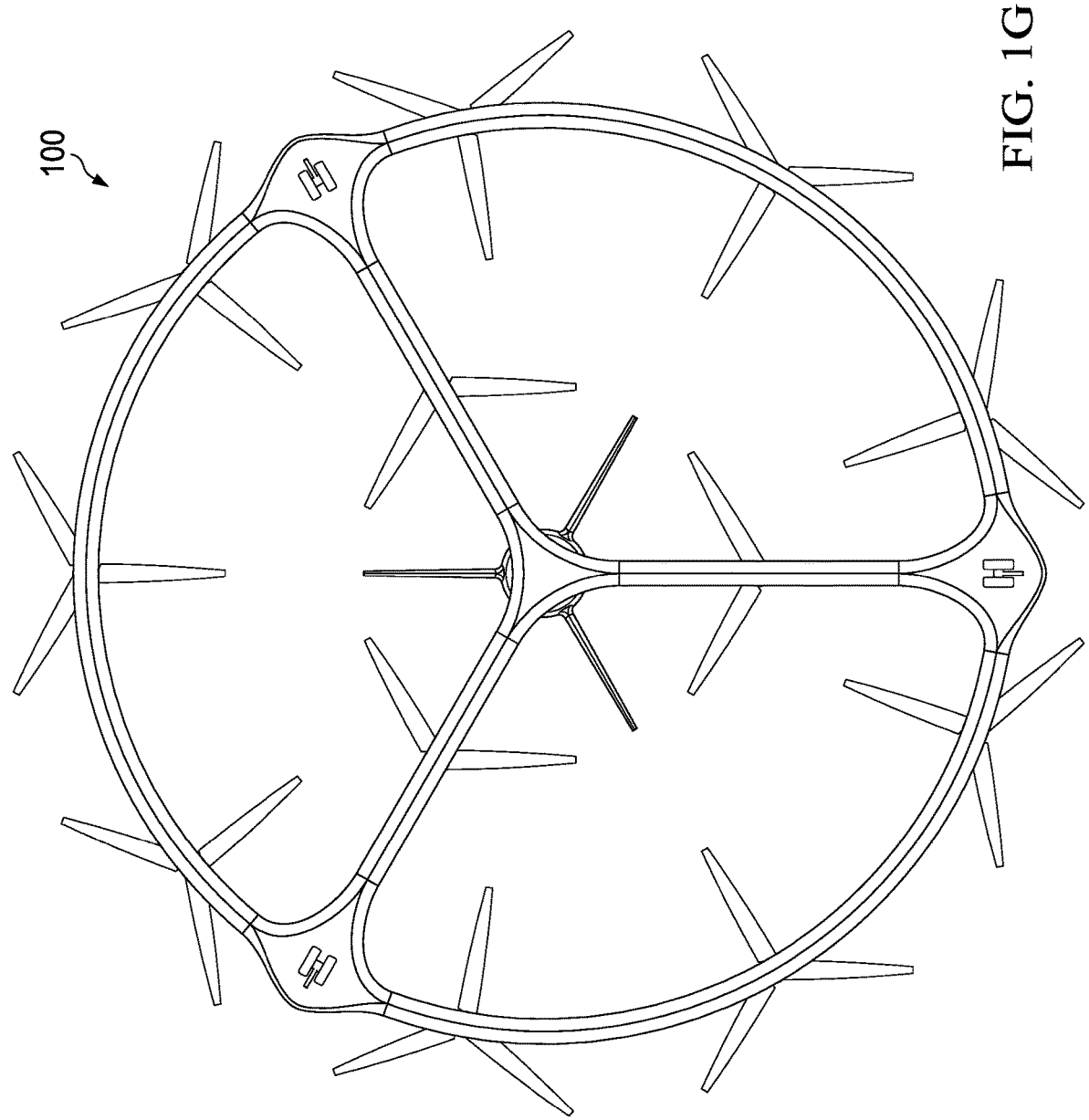
FIG. 1G is a bottom plan view of the closed wing aircraft of FIG. 1A.
Figure 2A:
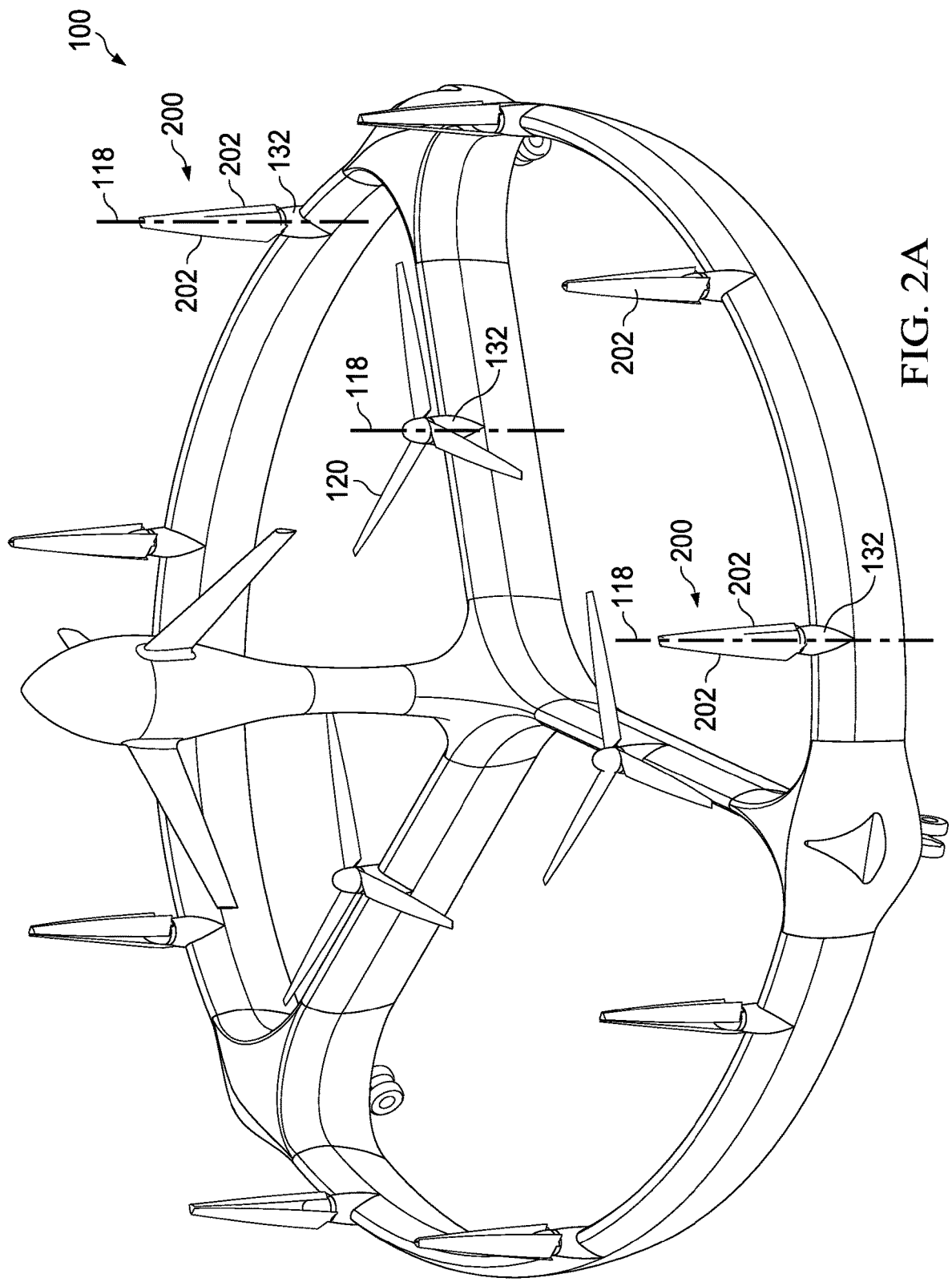
FIG. 2A is a perspective view of a closed wing aircraft in accordance with one embodiment of the present invention in which the rotors on the spokes are deployed and the rotors on the closed wing are folded forward.
Figure 2C:
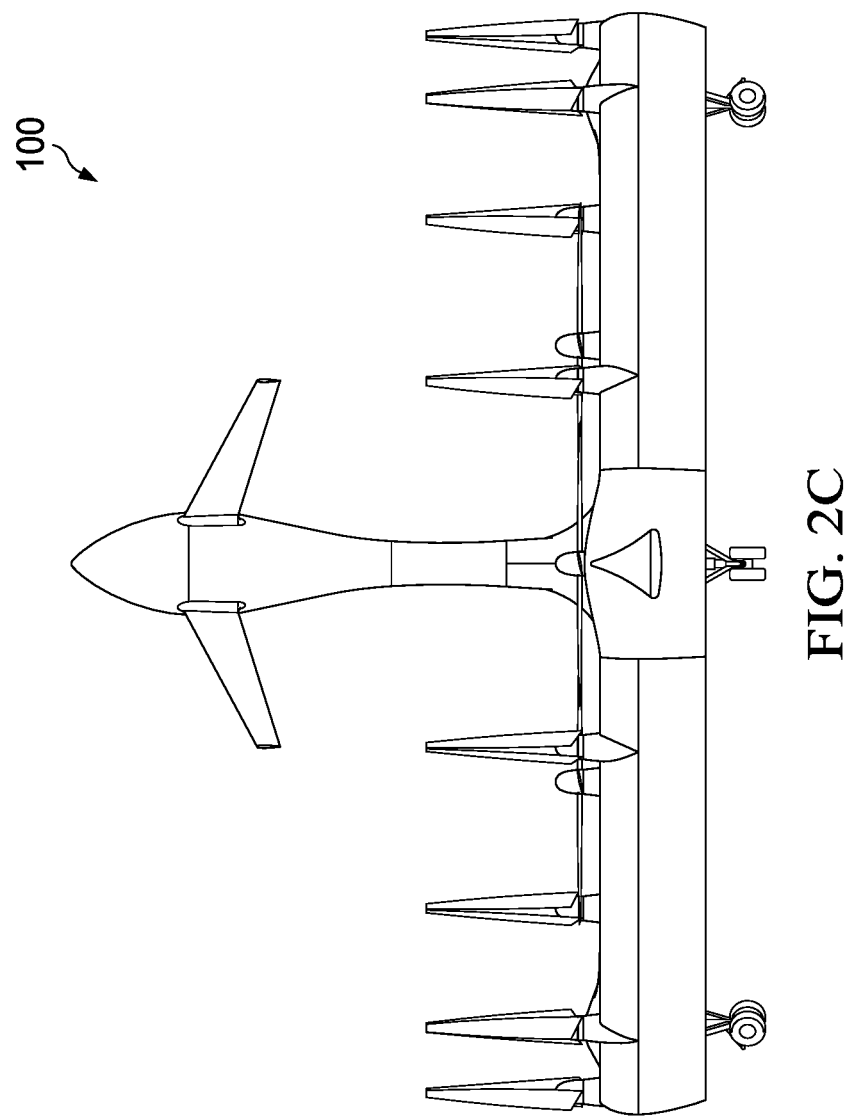
FIG. 2C is a rear elevation view of the closed wing aircraft of FIG. 2A.
Figure 2D:
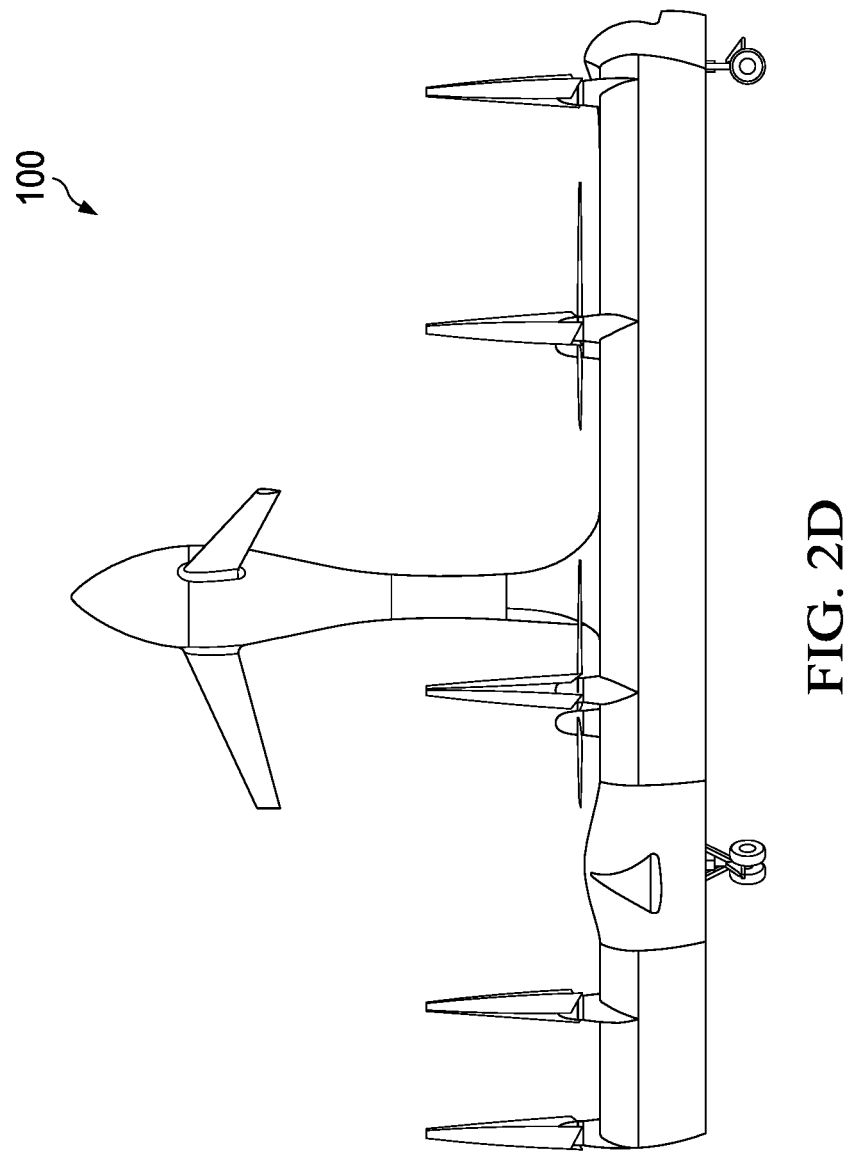
FIG. 2D is a right side elevation view of the closed wing aircraft of FIG. 2A.
Figure 2E:
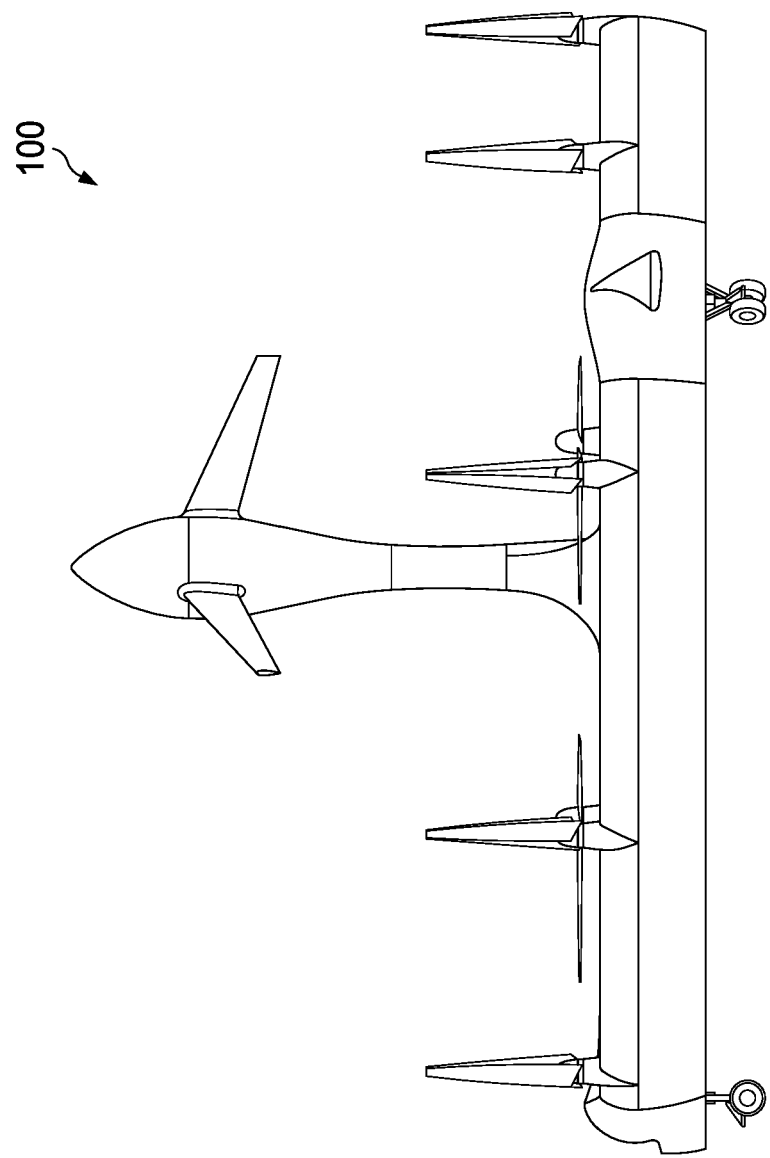
FIG. 2E is a left side elevation view of the closed wing aircraft of FIG. 2A.
Figure 2F:
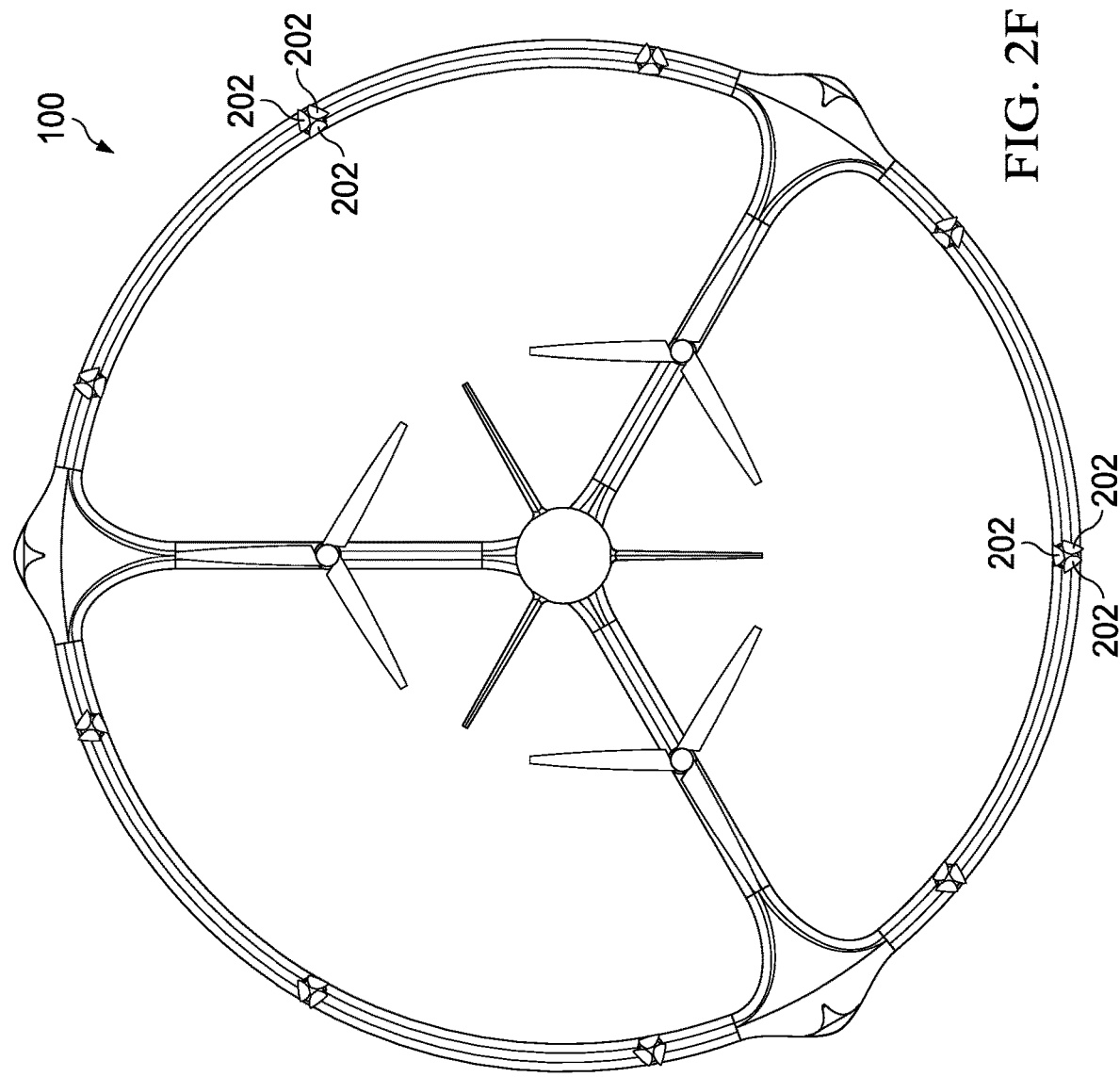
FIG. 2F is a top plan view of the closed wing aircraft of FIG. 2A.
Figure 2G:
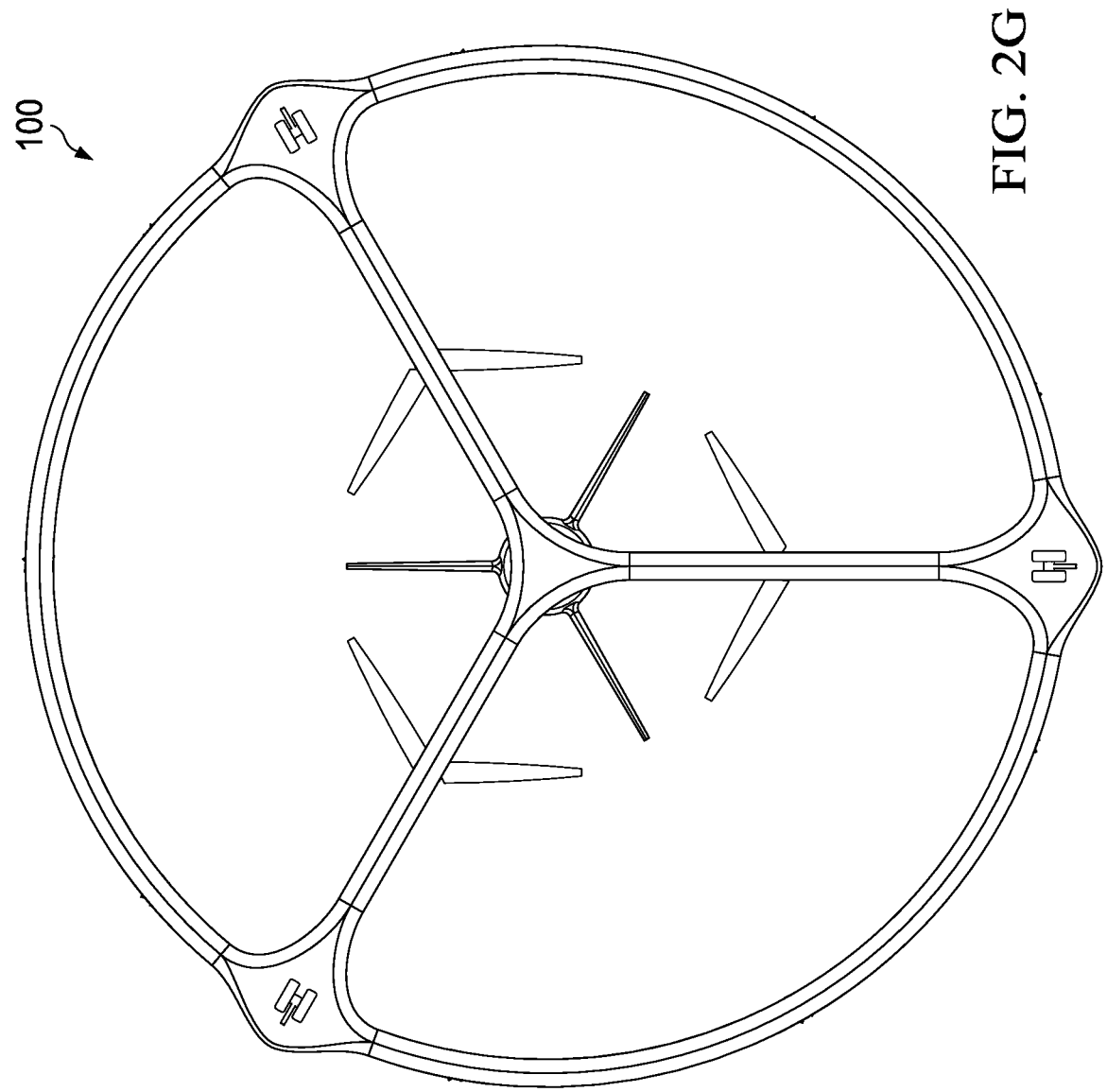
FIG. 2G is a bottom plan view of the closed wing aircraft of FIG. 2A.

Now referring to FIGS. 1A-1G, various views of a closed wing aircraft 100 in accordance with one embodiment of the present invention are shown. More specifically, FIG. 1A is a perspective view, FIG. 1B is a front elevation view, FIG. 1C is a rear elevation view, FIG. 1D is right side elevation view, FIG. 1E is a left side elevation view, FIG. 1F is a top plan view, and FIG. 1G is a bottom plan view. This closed wing aircraft 100 features the following: 1) Tail sitter configuration provides for conversion to airplane mode without reconfiguration; 2) Circular wing optimizes propulsion, structural, aerodynamic, and center of gravity (CG) requirements; 3) Gearboxes and drive train are completely eliminated; 4) Rotor cyclic and collective controls are replaced by variable speed constant pitch propellers; and 5) Yaw in vertical flight and roll in hover mode are provided by trailing edge surfaces on the spokes connecting the closed wing to the fuselage.

The closed wing aircraft 100 utilizes the ring wing configuration to provide a symmetric matrix distribution of hydraulic or electric motor driven propellers to maximize controllability and provide safety in the event of a hydraulic or electric motor failure. The ring wing also reduces the effects of cross winds during takeoff and landing by minimizing the affected wing area and eliminating induced yaw. In airplane mode flight the ring wing allows the aircraft maintain any roll position in order to position sensors as required. For noise reduction the propellers within the ring provide an acoustic barrier. Structurally, the combination of distributed propulsion and the ring wing minimizes bending moments allowing for lighter and stiffer structure compared with distributed propulsion on straight wings. Engines or fuel/batteries can be housed in the base of the fuselage or at the intersection of the spokes to the ring wing for strength and minimization of weight. Landing gear is positioned at these points for similar reasons.

More specifically, the aircraft 100 can be manned or unmanned and is capable of vertical takeoff and landing, stationary flight and forward flight. The aircraft 100 includes a closed wing 102, a fuselage 104 at least partially disposed within a perimeter of the closed wing 102, and one or more spokes 106 coupling the closed wing 102 to the fuselage 104. The closed wing 102 can be circular-shaped, oval-shaped, triangular-shaped, polygonal-shaped or any other shape suitable for the desired operational and aerodynamic requirements of the aircraft 100. In addition, the closed wing can be made up of a plurality of wing segments 102a, 102b, 102c and wing-spoke intersections or junctions 108a, 108b, 108c connected together. The cross-sectional profile of the closed wing 102 between the leading edge 110 and trailing edge 112 can be a symmetrical airfoil or any desirable aerodynamic shape. The number of spokes 106 can be determined, in part, by the shape and size of the closed wing 102, and the shape, size and payload of the fuselage 104. The cross-sectional profile of the spokes 106 between the leading edge 114 and the trailing edge 116 can be a symmetrical airfoil or any desirable aerodynamic shape. The closed wing 102, the fuselage 104 and the one or more spokes 106 are preferably symmetrically shaped to provide transition between vertical takeoff and landing, stationary flight and forward flight in any direction. However, non-symmetrical shapes can be used. As a result, the shape of the closed wing 102 and number of spokes 106 shown in the figures is only one example and is not intended to limit the scope of the invention. The closed wing 102 may also include one or more doors or removable sections that provide access to the fuselage 104 when the aircraft 100 is in a landed position.

The fuselage 104 may include one or more sections or modules that have a longitudinal axis 117 substantially parallel to a rotational axis 118 of the propellers 120. The shape and length of the fuselage 104 will vary depending on the desired mission and flight characteristics. As a result, the shape and length of the fuselage 104 shown in the figures is only one example and is not intended to limit the scope of the invention. For example, the fuselage 104 may include a rear section or module 122 substantially disposed at a center of the closed wing 102 that provides a fuselage-spoke intersection or junction, a middle section or module 124 connected to the rear section or module 122, a front section or module 126 connected to the middle module 124, and a nose section or module 128 connected to the front section or module 126. Sections or modules 122, 124, 126, 128 can be removably connected to one another, which makes the aircraft 100 configurable for any desired mission or function. In other words, the closed wing 102 and one or more spokes 106 provide a stable flight platform any desired payload. Moreover, the middle 124, front 126 and nose 128 sections or modules can detach, pivot, or retract at least partially into one or more of the other sections or modules for storage or transport of the aircraft 100. The rear 122, middle 124, front 126 and nose 128 sections or modules can be individually configured to be a cockpit module, a cabin module, an escape module, a payload module, a sensor module, a surveillance module, a power source module, a fuel module, or any combination thereof. Note that the nose section or module 128 may contain one or more parachutes.

The aircraft 100 also includes three or more landing gear, pads or skids 130 operably attached to the closed wing 102. Typically, the landing gear, pads or skids 130 will be disposed proximate to the wing-spoke intersections or junctions 108a, 108b, 108c where there is more structural support. The landing gear, pads or skids 130 can be retractable.

One or more engines or motors 132 are disposed within or attached to the closed wing 102, fuselage 104 or spokes 106 in a distributed configuration. Three or more propellers 120 are proximate to the leading edge 110 of the closed wing 102 or the leading edge 114 of the one or more spokes 106, distributed along the closed wing 102 or the one or more spokes 106, and operably connected to the one or more engines or motors 132. In the embodiment shown, nine propellers 120 are disposed proximate to the closed wing 102, and one propeller 120 is disposed proximate to each spoke 106. The propellers 120 can be variable speed constant pitch propellers or other type of propeller. The distribution and number of propellers 120 are designed to provide stability during the failure of one or more propellers 120, or engines or motors 132.

In one embodiment, a source of hydraulic or electric power is disposed within or attached to the closed wing 102, fuselage 104 or spokes 106 and coupled to each of the of hydraulic or electric motors 132 disposed within or attached to the closed wing 102, fuselage 104 or spokes 106. The source of hydraulic or electric power provides sufficient energy density for the aircraft to attain and maintain operations of the aircraft 100. The source of hydraulic or electric power can be one or more batteries, a piston engine, or a turboshaft engine. A controller is coupled to each of the hydraulic or electric motors 132, and one or more processors are communicably coupled to each controller that control an operation and speed of the plurality of hydraulic or electric motors 132. Note that a single source of hydraulic or electric power can drive multiple hydraulic or electric motors 132. For example, a source of hydraulic or electric power can be located in the wing-spoke intersections or junctions 108a, 108b, 108c or the rear fuselage 122 where there is more structural support. Hydraulic or electric power distribution systems can be used to transmit the power to the hydraulic or electric motors 132, which in turn drive the propellers 120. The hydraulic or electric motors 132 are selected based on at least one of aerodynamics, propulsive efficiency, structural efficiency, aeroelasticity, or weight of the aircraft. Moreover, the propellers 120, or the engines or motors 132 can be mounted to pivot to provide directional thrust. Similarly, additional thrusters can be disposed on the closed wing 102, fuselage 104 or spokes 106.

One or more flight control surfaces are disposed on or extending from the closed wing 102, spokes 106 or the fuselage 104 to provide improved control and flight characteristics. The one or more control surfaces may include one or more air foils, winglets, elevators or ailerons. For example and as shown in FIGS. 1A-1G, winglets 134 mounted on the forward section or module 126 of the fuselage 104. Note that the one or more airfoils or winglets can be retractable, removable, stowable or variable swept.

As shown in FIGS. 2A-2G, the propellers 120 can be selectively folded in a forward direction. Each propeller 200 includes two or more rotor blades 202 which are in mechanical communication with a hub and pivotable about an axis of rotation 118.

Figure 3A:
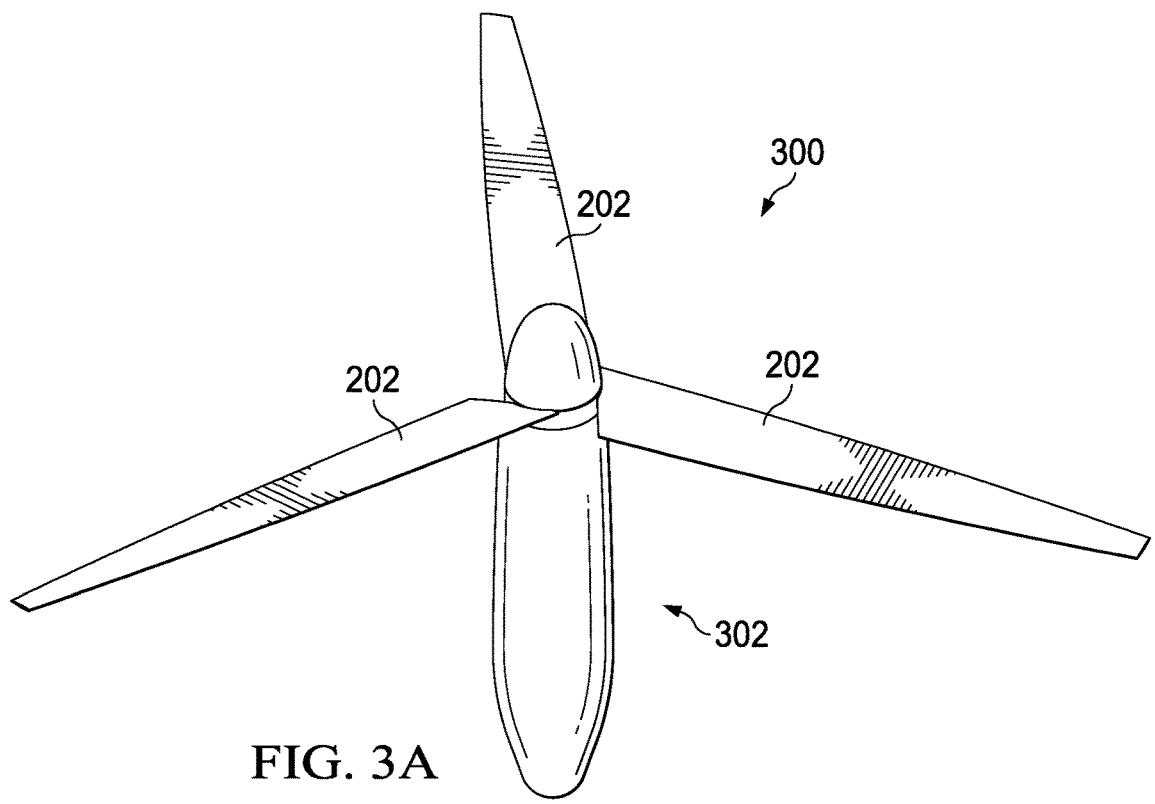
FIGS. 3A and 3B are perspective views of a rotor system in which the two or more rotor blades are in a deployed state (FIG. 3A) and a forward folded state (FIG. 3B) in accordance with one embodiment of the present invention.
Figure 3B:
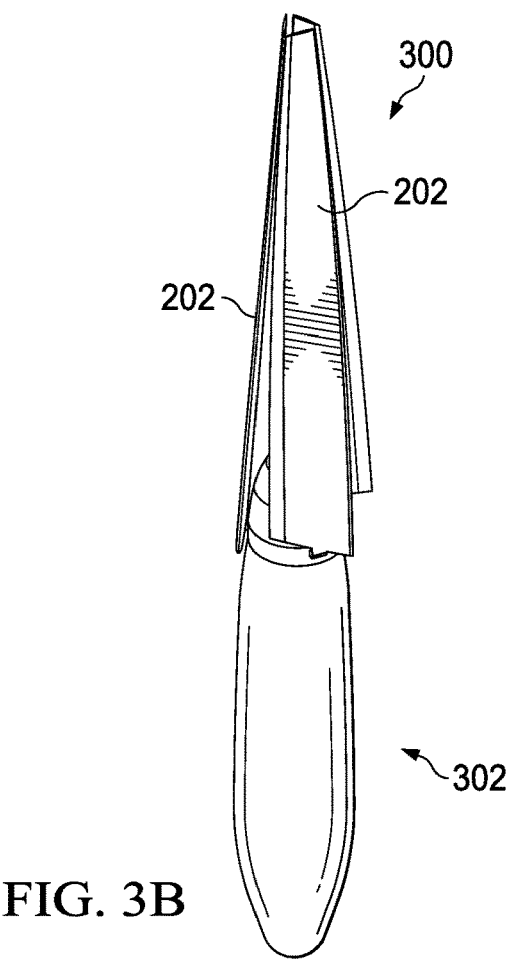

Now also referring to FIGS. 3A and 3B, a nacelle 302 having a rotor system 300 in which the two or more rotor blades 202 are in a deployed state (FIG. 3A) and a forward folded state (FIG. 3B) are shown in accordance with one embodiment of the present invention.

Figure 3C:
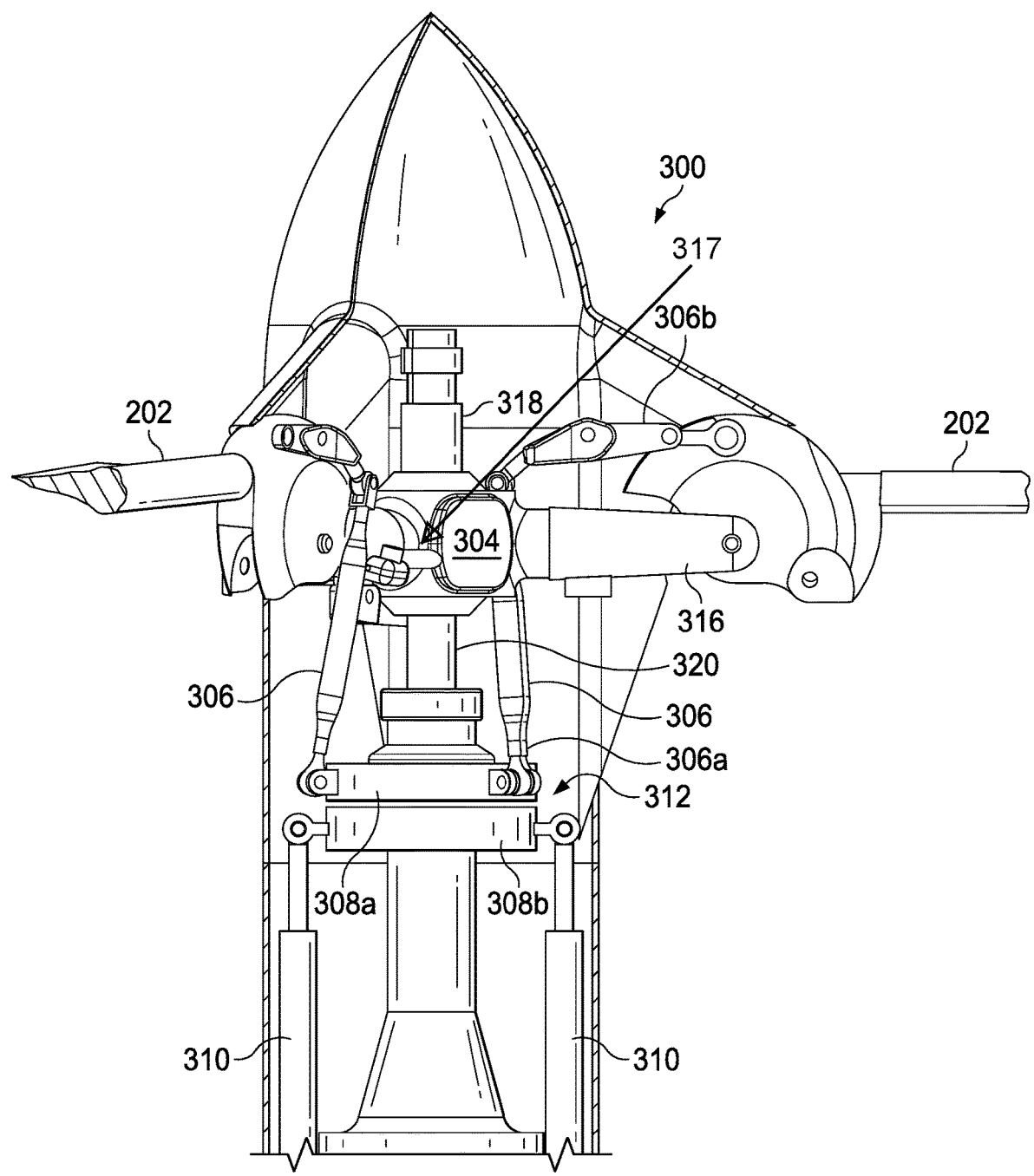
FIGS. 3C and 3D are cutaway views of a rotor system in which the two or more rotor blades are in a deployed state (FIG. 3C) and a forward folded state (FIG. 3D) in accordance with one embodiment of the present invention.
Figure 3D:
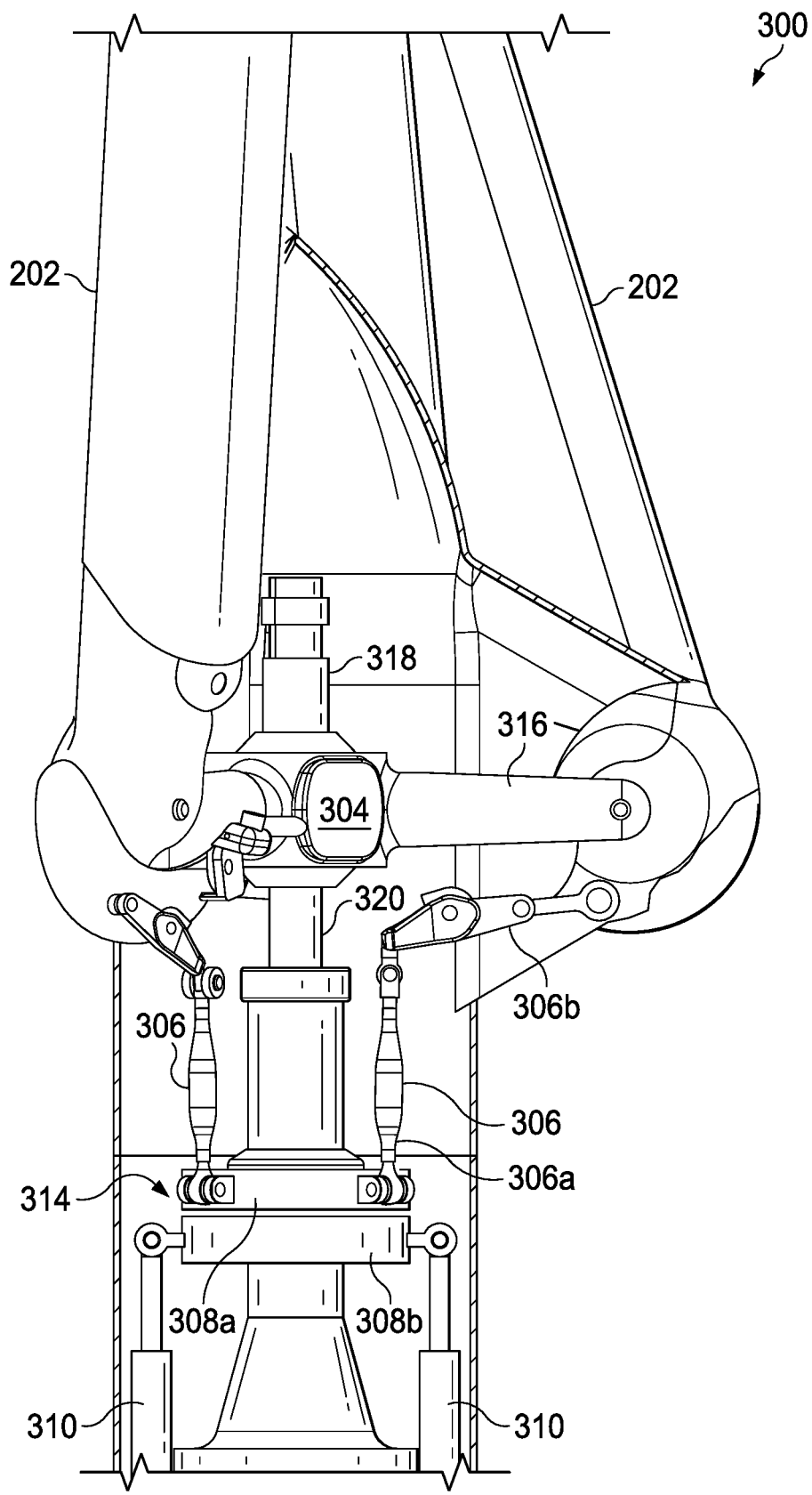

As shown in FIGS. 3C and 3D, cutaway views of a rotor system 300 in which the two or more rotor blades are in a deployed state (FIG. 3C) and a forward folded state (FIG. 3D) in accordance with one embodiment of the present are shown Each propeller 200 includes two or more rotor blades 202 which are in mechanical communication with a hub 304 and pivotable about an axis of rotation. A fold linkage 306 mechanically couples a rotating portion 308a of a bearing plate 308 (collectively 308a and 308b) to the rotor blade 202. The fold linkage 306 is positioned between the bearing plate 308 and the rotor blade 202 such that: 1) repositioning a first end 306a of the fold linkage 306 towards the hub 304 causes a second end 306b of the fold linkage 306 to pivot the rotor blade 202 towards the bearing plate 308; and 2) repositioning the first end 306a of the fold linkage 306 away from the hub 304 causes a second end 306b of the linkage to pivot the rotor blade 202 towards the hub 304. An actuator 310 is coupled to a non-rotating portion 308b of the bearing plate 308 and is operable to reposition the bearing plate 308 from a first position 312 to a second position 314 such that the folding links 306 pivot the rotor blades 202 from a deployed position to a forward folded position. In the forward folded position, the first position 312 of the bearing plate 308 is closer to the hub 304 than the second position 312 of the bearing plate 308. A grip 316 is disposed between the hub 304 and the rotor blade 202. A lock 317 is operable to selectively couple and decouple the fold linkage 306 and the grip 316. A lock 318 is operable to selectively couple and decouple the hub 304 and the grip 316. The lock 318 is also operable to selectively lock either folding of the rotor blade 202 or flapping movement of the hub 304. As shown in FIG. 3B, a tip of all the rotors 202 can be preloaded together in the forward folded position such that a vibration of the rotors 202 is minimized. Fold lock 317 or 318 is deployable in a locked position or in an unlocked position, such that the fold lock 317 or 318 is operable in the locked position to prevent at least some folding of the rotor blade 202, and the fold lock 317 or 318 is operable in the unlocked position to allow the at least some folding of the rotor blade 202. Flapping lock 318 is deployable in a locked position or in an unlocked position, such that the flapping lock 318 is operable in the locked position to prevent at least some flapping movement of the hub 304 relative to the shaft 320, and the flapping lock 318 is operable in the unlocked position to allow the at least some flapping movement of the hub 304 relative to the shaft 320.

Based on the foregoing, an aircraft may include a fuselage, a wing coupled to the fuselage, one or more engines or motors disposed within or attached to the wing or fuselage, a shaft operable connected to the one or more engines or motors, a hub in mechanical communication with the shaft, two or more rotor blades, each rotor blade in mechanical communication with the hub and pivotable about an axis of rotation, a bearing plate comprising a rotating portion and a non-rotating portion, a fold linkage coupled to the rotating portion of the bearing plate and in mechanical communication with the rotor blade, and an actuator coupled to the non-rotating portion of the bearing plate and operable to reposition the bearing plate from a first position to a second position such that the folding links pivot the rotor blades from a deployed position to a forward folded position.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15% from the stated value.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An aircraft, comprising:
    a fuselage;
    a closed wing coupled to the fuselage with one or more spokes, wherein the closed wing provides lift whenever the aircraft is in a forward flight;
    one or more engines or motors disposed within or attached to the wing or fuselage, wherein the one or more engines or motors provide lift whenever the aircraft is in vertical takeoff and landing and stationary flight, and provide thrust whenever the aircraft is in forward flight;
    wherein the closed wing, the fuselage and the one or more spokes are symmetrically shaped to provide transition between vertical takeoff and landing, stationary flight and forward flight in any direction;
    a shaft operably connected to the one or more engines or motors;
    a hub in mechanical communication with the shaft;
    two or more rotor blades, each rotor blade in mechanical communication with the hub and pivotable about an axis of rotation;
    a bearing plate comprising a rotating portion and a non-rotating portion;
    a fold linkage coupled to the rotating portion of the bearing plate and in mechanical communication with the rotor blade;
    an actuator coupled to the non-rotating portion of the bearing plate and operable to reposition the bearing plate from a first position to a second position, wherein the fold linkage pivots the rotor blades from a deployed position to a forward folded position; and
    wherein a tip of all the rotor blades are upstream from the hub and the hub is upstream from the bearing plate when the rotor blades are in the forward folded position.

2. The aircraft of claim 1, wherein the forward folded position comprises the first position of the bearing plate is closer to the hub than the second position of the bearing plate.

3. The aircraft of claim 1, further comprising a grip disposed between the hub and the rotor blade.

4. The aircraft of claim 3, further comprising a lock operable to selectively couple and decouple the fold linkage and the grip.

5. The aircraft of claim 3, further comprising a lock operable to selectively couple and decouple the hub and the grip.

6. The aircraft of claim 1, wherein the fold linkage is positioned between the bearing plate and the rotor blade such that repositioning a first end of the fold linkage towards the hub causes a second end of the fold linkage to pivot the rotor blade towards the bearing plate.

7. The aircraft of claim 1, wherein the fold linkage is positioned between the bearing plate and the rotor blade such that repositioning a first end of the fold linkage away from the hub causes a second end of the linkage to pivot the rotor blade towards the hub.

8. The aircraft of claim 1, further comprising a fold lock deployable in a locked position or in an unlocked position, the fold lock operable in the locked position to prevent at least some folding of the rotor blade, the fold lock operable in the unlocked position to allow the at least some folding of the rotor blade.

9. The aircraft of claim 1, further comprising a flapping lock deployable in a locked position or in an unlocked position, the flapping lock operable in the locked position to prevent at least some flapping movement of the hub relative to the shaft, the flapping lock operable in the unlocked position to allow the at least some flapping movement of the hub relative to the shaft.

10. The aircraft of claim 1, further comprising a lock operable to selectively lock either folding of the rotor blade or flapping movement of the hub.

11. The aircraft of claim 1, wherein a tip of all the rotor blades are preloaded together in the forward folded position such that a vibration of the rotor blades is reduced compared to the tip of all the rotor blades not being preloaded together.

12. The aircraft of claim 1, wherein the closed wing, the fuselage and the one or more spokes are not substantially reconfigured for transition between vertical takeoff and landing, stationary flight and forward flight.

13. A rotor blade rotation system comprising:
two or more rotor blades, each rotor blade in mechanical communication with a hub and pivotable about an axis of rotation;
a bearing plate comprising a rotating portion and a non-rotating portion;
a fold linkage coupled to the rotating portion of the bearing plate and in mechanical communication with the rotor blade;
an actuator coupled to the non-rotating portion of the bearing plate and operable to reposition the bearing plate from a first position to a second position, wherein the fold linkage pivots the rotor blades from a deployed position to a forward folded position; and
wherein a tip of all the rotor blades are upstream from the hub and the hub is upstream from the bearing plate when the rotor blades are in the forward folded position.

14. The rotor blade rotation system of claim 13, wherein the forward folded position comprises the first position of the bearing plate is closer to the hub than the second position of the bearing plate.

15. The rotor blade rotation system of claim 13, further comprising a grip disposed between the hub and the rotor blade.

16. The rotor blade rotation system of claim 15, further comprising a lock operable to selectively couple and decouple the fold linkage and the grip.

17. The rotor blade rotation system of claim 15, further comprising a lock operable to selectively couple and decouple the hub and the grip.

18. The rotor blade rotation system of claim 13, wherein the fold linkage is positioned between the bearing plate and the rotor blade such that repositioning a first end of the fold linkage towards the hub causes a second end of the fold linkage to pivot the rotor blade towards the bearing plate.

19. The rotor blade rotation system of claim 13, wherein the fold linkage is positioned between the bearing plate and the rotor blade such that repositioning a first end of the fold linkage away from the hub causes a second end of the linkage to pivot the rotor blade towards the hub.

20. The rotor blade rotation system of claim 13, further comprising a fold lock deployable in a locked position or in an unlocked position, the fold lock operable in the locked position to prevent at least some folding of the rotor blade, the fold lock operable in the unlocked position to allow the at least some folding of the rotor blade.

21. The rotor blade rotation system of claim 13, further comprising a flapping lock deployable in a locked position or in an unlocked position, the flapping lock operable in the locked position to prevent at least some flapping movement of the hub relative to the shaft, the flapping lock operable in the unlocked position to allow the at least some flapping movement of the hub relative to the shaft.

22. The rotor blade rotation system of claim 13, further comprising a lock operable to selectively lock either folding of the rotor blade or flapping movement of the hub.

23. The rotor blade rotation system of claim 13, wherein a tip of all the rotors are preloaded together in the forward folded position such that a vibration of the rotors is reduced compared to the tip of all the rotor blades not being preloaded together.

24. The rotor blade rotation system of claim 13, wherein the fold linkage is in mechanical communication with an upper portion of the rotor blade.

* * * * *